(12) United States Patent
Tiwari et al.

(10) Patent No.: US 9,774,518 B1
(45) Date of Patent: *Sep. 26, 2017

(54) METHODS AND APPARATUS FOR A DISTRIBUTED CONTROL PLANE

(71) Applicant: Juniper Networks, Inc., Sunnyvale, CA (US)

(72) Inventors: Manoj Tiwari, Mountain View, CA (US); Ravi Shekhar, Sunnyvale, CA (US); Quaizar Vohra, Cupertino, CA (US); Ronak Shah, Sunnyvale, CA (US); Prasennaram Dhanushkodi, Tamil Nadu (IN)

(73) Assignee: Juniper Networks, Inc., Sunnyvale, CA (US)

( * ) Notice: Subject to any disclaimer, the term of this patent is extended or adjusted under 35 U.S.C. 154(b) by 530 days.

This patent is subject to a terminal disclaimer.

(21) Appl. No.: 14/456,938

(22) Filed: Aug. 11, 2014

Related U.S. Application Data

(63) Continuation of application No. 13/618,820, filed on Sep. 14, 2012, now Pat. No. 8,804,571.

(51) Int. Cl.
*H04L 12/28* (2006.01)
*H04L 12/751* (2013.01)
*H04L 12/947* (2013.01)

(52) U.S. Cl.
CPC ............... *H04L 45/02* (2013.01); *H04L 49/25* (2013.01)

(58) Field of Classification Search
CPC ............... H04L 12/66; H04L 29/06217; H04L 29/06224; H04L 29/08702; H04L 65/103
See application file for complete search history.

(56) References Cited

U.S. PATENT DOCUMENTS

| | | | |
|---|---|---|---|
| 2006/0209716 A1* | 9/2006 | Previdi | H04L 12/5695 370/254 |
| 2008/0170578 A1* | 7/2008 | Ould-Brahim | H04L 12/4641 370/401 |
| 2010/0284305 A1* | 11/2010 | Papp | H04L 12/4641 370/254 |
| 2011/0032843 A1* | 2/2011 | Papp | H04L 12/4666 370/254 |
| 2013/0283379 A1* | 10/2013 | McDysan | H04L 63/0272 726/23 |

* cited by examiner

*Primary Examiner* — Jung-Jen Liu
(74) *Attorney, Agent, or Firm* — Cooley LLP (57) ABSTRACT

In some embodiments, an apparatus includes a first network control entity configured to be implemented at a first edge device. The first network control entity is configured to receive a control packet from a peripheral processing device via a tunnel that is between the peripheral processing device and the first network control entity and that includes at least a portion within a second edge device. The first network control entity is configured to determine routing information associated with the peripheral processing device based on the control packet. The first network control entity is configured to send the routing information to a second network control entity such that the second network control entity routes a data unit addressed to the peripheral processing device to the second edge device without sending the data unit to the first edge device.

20 Claims, 4 Drawing Sheets

Receive, at a first network control entity implemented at a first edge device from a set of edge devices within a distributed switch, a control packet from a peripheral processing device operably coupled to the distributed switch via a second edge device from the set of edge devices.
402

---

Determine routing information associated with the peripheral processing device based on the control packet.
404

---

Send the routing information to a second network control entity such that the second network control entity routes a data unit addressed to the peripheral processing device through the distributed switch without sending the data unit to the first edge device.
406

FIG. 4

METHODS AND APPARATUS FOR A DISTRIBUTED CONTROL PLANE

CROSS-REFERENCE TO RELATED APPLICATION

This application is a continuation of U.S. patent application Ser. No. 13/618,820, filed on Sep. 14, 2012, entitled "Methods and Apparatus for a Distributed Control Plane," which is incorporated herein by reference in its entirety.

BACKGROUND

Embodiments described herein relate generally to routing protocols for a distributed control plane environment in a switch fabric.

In some known monolithic router architectures, a routing protocol such as Border Gateway Protocol (BGP) is implemented as a single process within a single control plane domain that has access to all interior gateway protocols (IGP) and directly connected routes for resolving BGP routes. Such monolithic router architectures, however, typically do not scale well in a data center environment when traffic load increases.

Some known data center network architectures implement a distributed control plane by distributing the core engine (e.g., BGP core engine) among various nodes in a switch fabric. Such a distributed control plane, however, brings challenges to implementing layer-3 routing protocols such as BGP: distributing the core engine and the internal state of routing protocols for a distributed control plane can be challenging because each routing protocol typically has its own unique identifiers and other internal machinery that are designed for a monolithic router architecture.

Thus, a need exists for methods and apparatus that enable implementing a routing protocol for a distributed control plane environment in a switch fabric without modifying the core engine of the routing protocol.

SUMMARY

In some embodiments, an apparatus includes a first network control entity configured to be implemented at a first edge device. The first network control entity is configured to receive a control packet from a peripheral processing device via a tunnel that is between the peripheral processing device and the first network control entity and that includes at least a portion within a second edge device. The first network control entity is configured to determine routing information associated with the peripheral processing device based on the control packet. The first network control entity is configured to send the routing information to a second network control entity such that the second network control entity routes a data unit addressed to the peripheral processing device to the second edge device without sending the data unit to the first edge device.

DETAILED DESCRIPTION

In some embodiments, an apparatus includes a first network control entity configured to be implemented at a first edge device. The first network control entity is configured to receive a control packet from a peripheral processing device via a tunnel that is between the peripheral processing device and the first network control entity and that includes at least a portion within a second edge device. The first network control entity is configured to determine routing information associated with the peripheral processing device based on the control packet. In some embodiments, such a first network control entity can be referred to as a designated network control entity. In some embodiments, the control packet can be a Border Gateway Protocol (BGP) message. In some embodiments, the routing information can be layer-3 routing information.

The designated network control entity is configured to send the routing information to a second network control entity such that the second network control entity routes a data unit addressed to the peripheral processing device to the second edge device without sending the data unit to the first edge device. In some embodiments, such a second network control entity can be referred to as an edge device control entity. The edge device control entity can be implemented in a third edge device different from the first edge device and the second edge device. In some embodiments, the designated network control entity can be configured to send the routing information to a third network control entity (e.g., another edge device control entity) implemented at the second edge device.

In some embodiments, the designated network control entity and the edge device control entity are associated with a routing instance. In such embodiments, the designated network control entity can be configured to send the routing information to the edge device control entity without sending the routing information to any network control entity that is not associated with that routing instance.

Additionally, in some embodiments, the designated network control entity can be configured to store the routing information in a routing database associated with the designated edge device. Similarly, the edge device control entity can store the routing information in a routing database associated with the third edge device in response to receiving the routing information from the designated network control entity.

As used herein, a module can be, for example, any assembly and/or set of operatively-coupled electrical components, and can include, for example, a memory, a processor, electrical traces, optical connectors, software (executing in hardware), and/or the like.

As used herein, the singular forms "a," "an" and "the" include plural referents unless the context clearly dictates otherwise. Thus, for example, the term "a switch fabric" is intended to mean a single switch fabric or a combination of switch fabrics.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules in a system. Similarly stated, a single physical hop can include a link via which two modules are coupled without intermediate modules.

Accordingly, for example, if a first module is coupled to a second module via a single physical hop, the first module can send data units (e.g., data packets, data cells, etc.) directly to the second module without sending the data units through intervening modules.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data unit (e.g., data packets, data cells, etc.) to the second module and/or device using a destination address associated with the first protocol and the second module and/or device, regardless of the number of physical hops between the first device and the second device. In some embodiments, for example, a second protocol can use the destination address of the first protocol to route a data unit from the first module and/or device to the second module and/or device over the single logical hop. Similarly stated, when a first module and/or device sends a data unit to a second module and/or device via a single logical hop of a first protocol, the first module and/or device treats the single logical hop as if it is sending the data unit directly to the second module and/or device.

Figure 1:
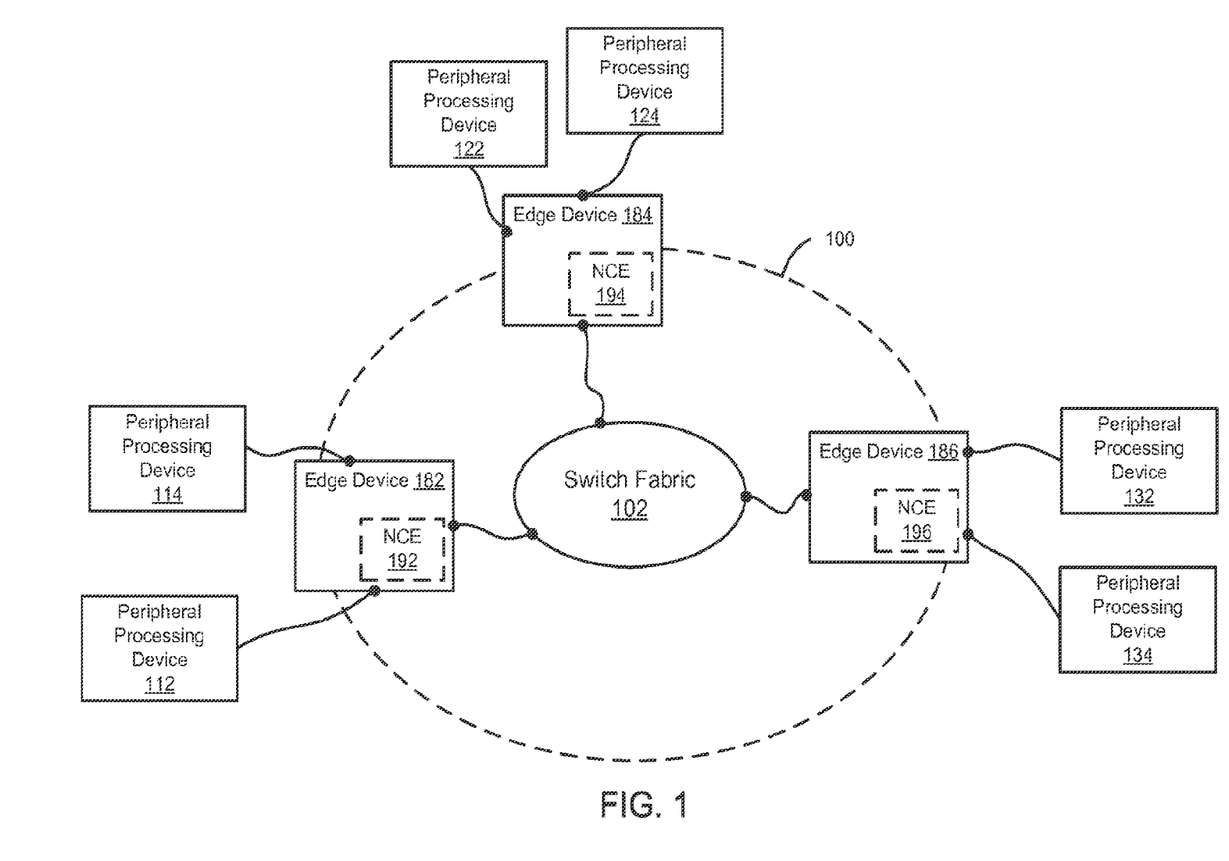
FIG. 1 is a schematic illustration of a switch fabric system, according to an embodiment.

FIG. 1 is a schematic illustration of a switch fabric system 100, according to an embodiment. The switch fabric system 100 includes a switch fabric 102 and multiple edge devices (e.g., edge devices 182, 184 and 186). Each edge device includes a network control entity (NCE). Specifically, the edge device 182 includes a network control entity 192; the edge device 184 includes a network control entity 194; and the edge device 186 includes a network control entity 196.

The switch fabric system 100 operatively couples multiple peripheral processing devices (e.g., peripheral processing devices 112, 114, 122, 124, 132 and 134) to each other. Specifically, the edge device 182 operatively couples the peripheral processing devices 112 and 114 to the switch fabric 102; the edge device 184 operatively couples the peripheral processing devices 122 and 124 to the switch fabric 102; and the edge device 186 operatively couples the peripheral processing devices 132 and 134 to the switch fabric 102.

The peripheral processing devices 112-134 can be, for example, compute nodes, service nodes, routers, switches, and storage nodes, etc. In some embodiments, for example, the peripheral processing devices 112-134 include servers, storage devices, gateways, workstations, and/or the like. In some embodiments, a peripheral processing device can be referred to as an external processing device that is not part of the associated switch fabric (e.g., the switch fabric 102). Similarly stated, in some embodiments, the peripheral processing devices 112-134 are not included in the switch fabric 102.

The peripheral processing devices 112-134 can be operatively coupled to one or more ports (not shown in FIG. 1) of the edge devices 182-186 using any suitable connection such as, for example, an optical connection (e.g., an optical cable and optical connectors), an electrical connection (e.g., an electrical cable and electrical connectors), and/or the like. Thus, the peripheral processing devices 112-134 can be configured to send data units (e.g., data packets, data cells, etc.) and control units (e.g., control packets, control cells, etc.) to and receive data units and/or control units from the switch fabric system 100 via the edge devices 182-186. In some embodiments, the connection between the peripheral processing devices 112-134 and the edge devices 182-186 is a direct link. Such a link can be said to be a single physical hop link. In other embodiments, the peripheral processing devices 112-134 can be operatively coupled to the edge devices 182-186 via intermediate modules and/or devices (not shown in FIG. 1). Such a connection can be said to be a multiple physical hop link.

Each edge device 182, 184, 186 can be any device configured to operatively couple peripheral processing devices 112-134 to the switch fabric 102. In some embodiments, for example, the edge devices 182-186 can be access switches, input/output modules, top-of-rack devices and/or the like. Structurally, the edge devices 182-186 can function as both source edge devices and destination edge devices. Accordingly, the edge devices 182-186 can be configured to send data units (e.g., data packets, data cells, etc.) to and receive data units from the switch fabric 102, and to and from the connected peripheral processing devices 112-134 that are connected to that edge device 182-186. Additionally, the edge devices 182-186 can be configured to send control signals (e.g., control packets) to and/or receive control signals from other edge devices 182-186 via the switch fabric 102. In some embodiments, the edge devices 182, 184, 186 can be structurally and/or functionally similar to the edge devices shown and described in U.S. patent application Ser. No. 12/495,337, filed Jun. 30, 2009, and titled "Methods And Apparatus Related To Any-To-Any Connectivity Within A Data Center," which is incorporated herein by reference in its entirety.

In some embodiments, each edge device 182, 184, 186 can be a combination of hardware modules and software modules (stored and/or executing in hardware). In some embodiments, for example, each edge device 182, 184, 186 can include a field-programmable gate array (FPGA), an application specific integrated circuit (ASIC), a digital signal processor (DSP) and/or the like.

As shown in FIG. 1, the edge devices 182-186 host network control entities 192-196, respectively, to manage ports (not shown in FIG. 1) of the respective edge devices 182-186 and data routing at the respective edge devices 182-186. Accordingly, the network control entities 192-196 can be part of a control plane of the switch fabric system 100. Each network control entity 192-196 can be, for example, a process, application, virtual machine, and/or some other software module (stored and/or executing in hardware) and/or a hardware module executed at the edge devices 182-186. As such, instructions that implement the network control entity 192-196 can be stored within a memory of the edge devices 182-186 and executed at a processor of the edge devices 182-186, as described in detail with respect to FIG. 2.

Each of the edge devices 182-186 is configured to communicate with the other edge devices 182-186 via the switch fabric 102. Specifically, the switch fabric 102 is configured to provide any-to-any connectivity between the edge devices coupled to the switch fabric 102 (including the edge devices 182-186) at relatively low latency. For example, the switch fabric 102 can be configured to transmit (e.g., convey) data units and/or control units between the edge devices 182-186. In some embodiments, the switch fabric 102 can have at least hundreds or thousands of ports (e.g., egress ports and/or ingress ports) through which the edge devices 182-186 can transmit and/or receive data and/or control units. In some embodiments, each edge device 182, 184, 186 can be configured to communicate with the other edge devices 182-186 over multiple data paths. More specifically, in some embodiments, multiple data paths exist, within the switch fabric 102, between a first edge device and a second edge device. In some embodiments, the switch fabric 102 can be structurally and/or functionally similar to the switch fabric shown and described in U.S. patent application Ser. No. 12/495,337, filed Jun. 30, 2009, and titled "Methods And Apparatus Related To Any-To-Any Connectivity Within A Data Center," which is incorporated herein by reference in its entirety.

The edge devices 182-186 can include one or more network interface devices (e.g., a 40 Gigabit (Gb) Ethernet interface, a 100 Gb Ethernet interface, etc.) through which the edge devices 182-186 can send signals (e.g., data signals, control signals) to and/or receive signals from the switch fabric 102. The signals can be sent to and/or received from the switch fabric 102 via an electrical link, an optical link and/or a wireless link operatively coupled to the edge devices 182-186. In some embodiments, the edge devices 182-186 can be configured to send signals to and/or receive signals from the switch fabric 102 based on one or more protocols such as, for example, an Ethernet protocol, a multi-protocol label switching (MPLS) protocol, a Fibre Channel protocol, a Fibre-Channel-over Ethernet (FCoE) protocol, an Infiniband-related protocol, a cell-based protocol, etc.

Figure 2:
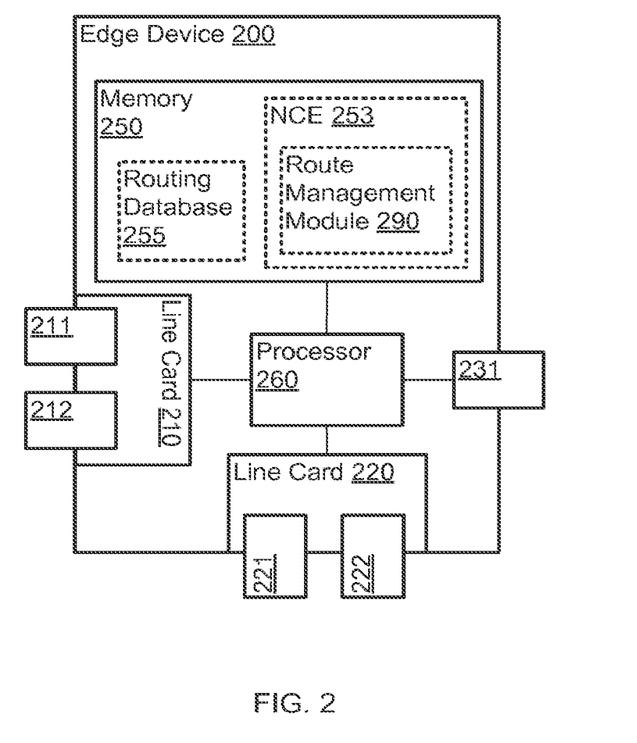
FIG. 2 is a system block diagram of an edge device that includes a network control entity, according to an embodiment.

FIG. 2 is a system block diagram of an edge device 200 that includes a network control entity 253, according to an embodiment. The edge device 200 can be structurally and functionally similar to the edge devices 182-186 shown and described with respect to FIG. 1. Particularly, the edge device 200 can be included in a switch fabric system similar to the switch fabric system 100 in FIG. 1. As shown in FIG. 2, the edge device 200 includes a processor 260; a memory 250 including a routing database 255 and the network control entity 253, which includes a route management module 290; line cards 210, 220; and a port 231. The processor 260 is operatively coupled to the memory 250, the line card 210, the line card 220 and the port 231. The line card 210 includes ports 211 and 212. The line card 220 includes ports 221 and 222. In some embodiments, the line cards 210 and/or 220 each can include one or more processors and/or memories. In some embodiments, a port can be any entity that can actively communicate with a coupled device or over a network. Such a port need not necessarily be a hardware port, but can be a virtual port or a port defined by software.

In some embodiments, the ports 211, 212, 221 and 222 can communicate with, for example, peripheral processing devices coupled to the edge device 200. For example, the ports 211, 212, 221 and 222 can implement a physical layer using fiber-optic signaling via fiber-optic cables. In some embodiments, some of the ports 211, 212, 221 and 222 can implement one physical layer such as fiber-optic signaling and others of the ports 211, 212, 221 and 222 can implement a different physical layer such as twisted-pair electrical signaling. Furthermore, the ports 211, 212, 221 and 222 can allow the edge device 200 to communicate with peripheral processing devices such as, for example, computer servers, via a common protocol such as Fibre Channel or Ethernet. In some embodiments, some of the ports 211, 212, 221 and 222 can implement one protocol such as Fibre Channel and others of the ports 211, 212, 221 and 222 can implement a different protocol such as Ethernet. Thus, the edge device 200 can be in communication with multiple peripheral processing devices using homogeneous or heterogeneous physical layers and/or protocols via the ports 211, 212, 221 and 222.

In some embodiments, the port 231 can be connected to a device (e.g., a switching device, a routing device) within a switch fabric (e.g., the switch fabric 102 in FIG. 1), such that the edge device 200 can be operatively coupled to other devices via the switch fabric. The port 231 can be part of one or more network interfaces (e.g., a 40 Gigabit (Gb) Ethernet interface, a 100 Gb Ethernet interface, etc.) through which the edge device 200 can send signals to and/or receive signals from the switch fabric. The signals can be sent to and/or received from the switch fabric via an optical link, an electrical link and/or a wireless link operatively coupled to the edge device 200. In some embodiments, the edge device 200 can send signals to and/or receive signals from the switch fabric based on one or more protocols (e.g., a Fibre Channel protocol, a FCoE protocol, an Ethernet protocol, a MPLS protocol, an Infiniband-related protocol, etc.).

In some embodiments, the port 231 can implement a different physical layer and/or protocol than those implemented at the ports 211, 212, 221 and 222. For example, the ports 211, 212, 221 and 222 can communicate with peripheral processing devices using a protocol based on data packets and the port 231 can communicate via the switch fabric using a protocol based on data cells. In such embodiments, the edge device 200 can be, for example, an edge device of a network switch such as a distributed network switch.

In some embodiments, the memory 250 can be, for example, a random-access memory (RAM) (e.g., a dynamic RAM, a static RAM), a flash memory, a removable memory, and/or so forth. The routing database 255 included in the memory 250 can be, for example, a table, a list and/or any other data structure configured to store routing information for peripheral processing devices coupled to the switch fabric system that includes the edge device 200. For example, the routing database 255 can store routing information associated with routing data units (e.g., data packets, data cells) to a peripheral processing device that is not directly coupled to the edge device 200. Furthermore, in some embodiments, the routing information stored in the routing database 255 can be determined at the network control entity 253 within the edge device 200. In other embodiments, the routing information stored in the routing database 255 can be determined at another network control entity (e.g., implemented in another edge device) and sent to the edge device 200.

Similar to the network control entities 192-196 in FIG. 1, the network control entity 253 can be, for example, a process, application, virtual machine, and/or some other software module (stored and/or executing in hardware) and/or a hardware module configured to manage one or more edge devices (including the edge device 200) and ports (e.g., the ports 211, 212, 221, 222, 231) of the edge device 200 and/or other devices. In some embodiments, instructions that implement the network control entity 253 can be stored within the memory 250 and executed at the processor 260. For example, the network control entity 253 can be implemented as, within the memory 250, a non-transitory processor-readable medium that stores code representing instructions to be executed by the processor 260.

In some embodiments, for example, the network control entity 253 can manage and/or maintain configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with a group of edge devices (including the edge device 200) and their associated ports. The network control entity 253 can also, for example, monitor a state and/or status of peripheral processing devices associated with the group of edge devices, and/or manage and maintain other information associated with the peripheral processing devices and/or ports associated with the group of edge devices.

In some embodiments, the network control entity 253 can be configured to function as a designated network control entity and/or an edge device control entity. Specifically, the network control entity 253 can be configured to determine, send, receive, and/or store routing information for peripheral processing devices coupled to the switch fabric system that includes the edge device 200. For example, the network control entity 253 can be configured to receive routing information associated with a peripheral processing device from another network control entity (e.g., a designated network control entity) at another edge device operatively coupled to the edge device 200 via the switch fabric. The network control entity 253 can then be configured to store the received routing information in the routing database 255 and update the associated content in the routing database 255 accordingly. In this example the network control entity 253 functions as an edge device control entity.

For another example, the network control entity 253 can be configured to determine routing information for a peripheral processing device based on a control packet received from that peripheral processing device. The network control entity 253 can then be configured to send the routing information to other network control entities (e.g., edge device control entities) at other edge devices, such that the routing information can be stored and used at the other edge devices. In this example the network control entity 253 functions as a designated network control entity. Details of determining and distributing routing information are further described below with respect to FIGS. 1, 3 and 4.

Similar to the network control entity 253, the route management module 290 can be, for example, a process, application, virtual machine, and/or some other software module (stored and/or executing in hardware) and/or hardware module implemented within the memory 250. The route management module 290 can be configured to manage routing data units (e.g., data packets, data cells) that are received at the edge device 200. Specifically, the route management module 290 can be configured to send the received data units to appropriate devices (e.g., peripheral processing devices directly coupled to the edge device 200, switching devices in the switch fabric) based on the routing information stored in the routing database 255. Details of routing data units based on the stored routing information are further described below with respect to FIGS. 1, 3 and 4. Additionally, in some embodiments, the route management module 290 can be implemented within the network control entity 253, as shown in FIG. 2. In other embodiments, the route management module 290 can be separate from the network control entity 253.

Returning to FIG. 1, the switch fabric 102 can be any suitable switch fabric that operatively couples the edge devices 182-186 to the other edge devices 182-186 via one or multiple data paths. The switch fabric system 100 includes a data plane portion and a control plane portion.

The data plane portion of the switch fabric system 100 facilitates transmission of data between peripheral processing devices 112-134. In some embodiments, the data plane portion of the switch fabric system 100 includes a switch fabric (i.e., the switch fabric 102) having one or more stages. For example, the switch fabric 102 can be a Clos switch fabric network (e.g., a non-blocking Clos network, a strict sense non-blocking Clos network, a Benes network) having multiple stages of switching modules (e.g., integrated Ethernet switches). Such a switch fabric can include any number of stages. In some embodiments, for example, the switch fabric 102 can include three, five, seven or nine stages.

In some embodiments, the data plane portion of the switch fabric 102 can be (e.g., can function as) a single consolidated switch (e.g., a single large-scale consolidated layer-2 (L2) or layer-3 (L3) switch). In other words, the data plane portion of the switch fabric 102 can operate as a single logical entity (e.g., a single logical network element). Similarly stated, the data plane portion of the switch fabric 102 can be part of a single logical hop between a first edge device 182, 184 or 186 and a second edge device 182, 184 or 186 (e.g., along with the data paths between the edge devices 182-186 and the switch fabric 102). Furthermore, the data plane portion of the switch fabric system 100 can couple (e.g., indirectly connect, facilitate communication between) the peripheral processing devices 112-134. In some embodiments, the switch fabric 102 can be configured to communicate via interface devices (fibre-channel interface devices, not shown in FIG. 1) that are configured to transmit data at a rate of at least 10 Gb/s. In some embodiments, the switch fabric 102 can be configured to communicate via interface devices that are configured to transmit data at a rate of, for example, 2 Gb/s, 4 Gb/s, 8 Gb/s, 10 Gb/s, 40 Gb/s, 100 Gb/s and/or faster link speeds.

In some embodiments, although the data plane portion of the switch fabric 102 can be logically centralized, the implementation of the data plane portion of the switch fabric 110 can be highly distributed, for example, for reliability. For example, portions of the data plane portion of the switch fabric 102 can be physically distributed across, for example, many chassis. In some embodiments, for example, a stage of the data plane portion of the switch fabric 102 can be included in a first chassis and another stage of the data plane portion of the switch fabric 102 can be included in a second chassis. Both of the stages can logically function as part of a single consolidated switch (e.g., within the same logical hop) but have a separate single physical hop between respective pairs of stages.

On the other hand, the control plane portion of the switch fabric system 100 facilitates transmission of control signals (e.g., configuration information, route information, etc.) between the network control entities 192-196. As described in further detail herein, routing information such as instructions to install a route, resolve a route, route updates, etc., can be transmitted between network control entities 192-196 via the control plane portion of the switch fabric 102. In some embodiments, the control plane portion of the switch fabric 102 includes direct links between the network control entities 192-196. In some other embodiments, the control plane portion of the switch fabric 102 includes intermediate modules and/or switches (not shown in FIG. 1) to operatively couple each network control entity 192, 194 or 196 with each other network control entity 192, 194 or 196. In still other embodiments, the control plane portion of the switch fabric 102 includes a combination of direct links and intermediate modules and/or switches.

In some embodiments, the control plane portion of the switch fabric system 100 can facilitate data routing within the switch fabric system 100 by implementing a routing protocol at the edge devices 182-186. Such a routing protocol can be a layer-3 (the network layer in the Open Systems Interconnection (OSI) model) routing protocol such as, for example, BGP. Specifically, the edge devices 182-186 can be configured to determine routing information associated with the peripheral processing devices 192-196 and distribute the routing information across the switch fabric system 100, such that data units can be routed within the data plane of the switch fabric system 100 based on the routing information.

In some embodiments, a BGP core engine can be hosted and executed at a network control entity within an edge device in the switch fabric system 100. Such a network control entity can be configured to maintain BGP peers between that network control entity and other network control entities of the switch fabric system 100. In some embodiments, such a network control entity is referred to as a designated network control entity, a master network control entity, a network node group (NNG) or a network intelligent network element (INE). Meanwhile, some other network control entities in the switch fabric system 100 can be configured to relay control packets (e.g., BGP messages) to the network control entity that executes the BGP core engine, such that the other network control entities can form BGP peering with the network control entity that executes the BGP core engine. In some embodiments, such other network control entities are referred to as edge device control entities, slave network control entities, server node groups (SNG) or server INEs.

In the example of FIG. 1, for example, the network control entity 194 can function as a designated network control entity (or master network control entity) and the network control entities 192 and 196 can function as edge device control entities (or slave network control entities). That is, the network control entity 194 can be configured to host and execute a BGP core engine, and the network control entities 192 and 196 can be configured to form BGP peering with the network control entity 194 by relaying control packets to the network control entity 194. Specifically, each of the network control entities 192 and 196 can be configured to form BGP peering with the network control entity 194, respectively, via a relay mechanism. As a result, the network control entities 192 and 196 can be configured to relay control packets (e.g., BGP messages) received from the peripheral processing devices 112, 114, 132 and 134 to the network control entity 194. In this way, as described in detail below, the BGP core engine is maintained in a centralized fashion at the network control entity 194 while the BGP function is supported in a distributed fashion at the network control entities 192-196.

For example, the peripheral processing device 114 can send a control packet to the edge device 182. Such a control packet can include information associated with routing data generated from or destined to the peripheral processing device 114. In some embodiments, for example, such a control packet can be a BGP message including information related to a BGP route or a BGP update associated with the peripheral processing device 114.

In response to receiving the control packet, the network control entity 192 at the edge device 182 is configured to forward the control packet to the network control entity 194 via the switch fabric 102 based on the BGP peering between the network control entity 192 and the network control entity 194. In some embodiments, the control packet can be tunneled from the peripheral processing device 114 to the network control entity 194 via the edge device 182 based on a tunneling protocol such as, for example, the Generic Routing Encapsulation (GRE) protocol, the Layer 2 Tunneling Protocol (L2TP), or any other suitable tunneling protocol. In such embodiments, the tunnel between the peripheral processing device 114 and the network control entity 194 parses through the edge device 182 and includes a portion of the edge device 182. For example, the peripheral processing device 114 can send the control packet to the network control entity 194 via a tunnel between a line card of the edge device 182 and the network control entity 194 through the control plane portion of the switch fabric 102, based on the GRE protocol.

In some embodiments, such a tunnel is used to transmit control units (e.g., BGP messages), but not data units, from the peripheral processing devices to the network control entity 194. In some embodiments, such a tunnel can be used to transmit control packets between control plane entities that are distributedly implemented at different chassis. For example, the peripheral processing devices 112, 114 and the edge device 182 are included in a first chassis, while the peripheral processing devices 122, 124 and the edge device 184 are included in a second chassis different from the first chassis. Thus, a tunnel between the peripheral processing device 114 or 112 to the network control entity 194 can be used to transmit control packets from a control plane of the first chassis to a control plane of the second chassis.

In response to receiving the control packet, the network control entity 194 is configured to store the information included in the control packet in a memory associated with the network control entity (e.g., a memory within the edge device 184). Particularly, the network control entity 194 is configured to store BGP information (e.g., BGP route, BGP update) included in the control packet at, for example, a memory of the edge device 184 (e.g., the memory 250 of the edge device 200 in FIG. 2). Similarly, the network control entity 194 can be configured to receive, store, maintain and update BGP information from other peripheral processing devices 112-134.

In some embodiments, similar to receiving the control packet from the peripheral processing device 114 as described herein, the network control entity 194 can be configured to receive the BGP information (e.g., included in a control packet) via an edge device control entity (e.g., the network control entity 192, 196) that functions as a relay. In such embodiments, the BGP information can be sent to the network control entity 194 via a tunnel associated with (e.g., passing through) that edge device control entity. In other embodiments, the network control entity 194 can be configured to receive the BGP information from a peripheral processing device (e.g., the peripheral processing device 122, 124) that is directly coupled to the edge device 184, where an edge device control entity is not used as a relay. In such embodiments, the BGP information can be sent from that peripheral processing device to the network control entity 194 without using a tunnel. For example, the peripheral processing device 122 can send BGP information directly to network control entity 194 at edge device 184 without passing through another network control entity 194 or 196.

As a result, BGP information associated with the peripheral processing devices 112-134 is gathered, maintained and updated at the network control entity 194. The network control entity 194 is configured not to send the BGP information to any edge device control entity (e.g., the network control entity 192, 196). Furthermore, each edge device control entity does not store the BGP information when that edge device control entity functions as a relay for the BGP information, as the BGP information is tunneled through that edge device control entity. Thus, the BGP information is not obtained, stored and/or maintained at any edge device control entity of the switch fabric system 100.

After the control packet from the peripheral processing device 114 is received at the network control entity 194, the network control entity 194 is configured to determine routing information associated with the peripheral processing device 114 based on the received control packet. Such routing information can include, for example, an IP address of the peripheral processing device 114, an identifier of an edge device directly coupled to the peripheral processing device 114 (e.g., the edge device 182), an identifier of a next hop for transmitting data generated at or destined to the peripheral processing device 114, and/or the like.

After the routing information associated with the peripheral processing device 114 is determined, the network control entity 194 is configured to store the routing information in a memory of the edge device 184. In some embodiments, the routing information can be stored in a routing database (e.g., the routing database 255 in FIG. 2) within the edge device 184.

Furthermore, the network control entity 194 can be configured to send the routing information associated with the peripheral processing device 114 to one or more edge device control entities (e.g., the network control entity 192, 196), such that the one or more edge device control entities can store and implement the routing information at the edge devices that host the edge device control entities.

In some embodiments, the network control entity 194 can be configured to send the routing information associated with the peripheral processing device 114 to a network control entity in response to receiving a request from that network control entity. A request can be sent from a network control entity on an as-needed basis. For example, the network control entity 196 can send a request to the network control entity 194, requesting information associated routing data units to the peripheral processing device 114. In response to such a request, the network control entity 194 is configured to send the routing information associated with the peripheral processing device 114, which is determined based on the control packet received from the peripheral processing device 114, to the network control entity 196. As a result, the network control entity 196 receives the routing information associated with the peripheral processing device 114, and further stores the routing information in a routing database within the edge device 186.

In some embodiments, the network control entity 194 can be associated with one or more routing instances. A routing instance can be defined based on and/or associated with, for example, an organization, a company, a school and/or the like. For example, the network control entity 194 can be associated with a routing instance for Company One and a routing instance for Company Two. Each routing instance can include a specific group of devices such as servers, routers, switching devices, peripheral processing devices, etc. Furthermore, each routing instance can be associated with a set of network control entities. For example, the routing instance for Company One includes the peripheral processing devices 112, 114, 124 and 134, and is associated with the network control entities 192, 194 and 196; the routing instance for Company Two includes the peripheral processing devices 122 and 132, and is associated with the network control entities 194 and 196.

In the example of FIG. 1 described herein, after the routing information associated with the peripheral processing device 114 is determined at the network control entity 194, the network control entity 194 can be configured to distribute the routing information to the network control entities that are associated with a common routing instance as the peripheral processing device 114. Specifically, the network control entity 194 can be configured to send the routing information to the network control entities 192 and 196 that are associated with the routing instance for Company One, with which the peripheral processing device 114 is associated.

In some embodiments, routing information is not shared between different routing instances. Thus, routing information associated with a peripheral processing device of a first routing instance is not sent to a network control entity that is associated with a second routing instance but not associated with the first routing instance. In the example of FIG. 1 described above, the network control entity 194 does not send the routing information associated with the peripheral processing device 114, which is included in the routing instance for Company One, to a network control entity (not shown in FIG. 1) that is associated with the routing instance for Company Two but not associated with the routing instance for Company One. In some embodiments, however, a default device (e.g., a router) can be used to store and implement routing information associated with multiple or all routing instances. Such a default device can be used as an alternative to route data units when devices from different routing instances are to send data to each other.

After the routing information associated with the peripheral processing device 114 is received at the network control entity 192 or 196, the network control entity 192 or 196 can be configured to store the routing information in the associated edge device 182 or 186 if the routing information is to be used for future data plane routing. That is, the network control entity 192 or 196 can be configured to determine if the routing information associated with the peripheral processing device 114 is to be used (e.g., based on if an associated request has been received or not). If the routing information is to be used, the routing information is stored; otherwise the routing information is discarded. In some embodiments, similar to the network control entity 194, the network control entity 192 or 196 can be configured to store the routing information in a routing database (e.g., the routing database 255 in FIG. 2) within the edge device 182 or 186.

After the routing information associated with the peripheral processing device 114 is stored at the edge device 182, 184 or 186, route resolution can be performed independently at each of the network control entity 192, 194 or 196. Specifically, a routing protocol (e.g., BGP) can be locally executed at the network control entity 192, 194 or 196 to determine, based on the routing information associated with the peripheral processing device 114, routes within the data plane for sending (e.g., forwarding) data-plane data units received at the edge device 182, 184 or 186, which are generated at or destined to the peripheral processing device 114. In some embodiments, information representing the determined routes can be stored in a routing database at the edge device 182, 184 or 186 (e.g., the routing database 255 of the edge device 200 in FIG. 2). Furthermore, information representing the determined routes can be implemented at line cards of the edge device 182, 184 or 186 such that data-plane data units generated at or destined to the peripheral processing device 114 can be sent to an appropriate next hop within the data plane based on the determined routes (e.g., the associated routes and/or the resultant routes).

For example, the network control entity 196 can be configured to perform route resolution based on the routing information associated with the peripheral processing device 114. As a result, a route (e.g., a next hop) for sending data-plane data units that are received at the edge device 186 and destined to the peripheral processing device 114 can be determined at the network control entity 196. Such a data-plane route can be associated with, for example, a data path from the edge device 186 to the edge device 182 through the data plane portion of the switch fabric 102. In some embodiments, as shown in FIG. 1, such a route (e.g., the data path) does not include the edge device that hosts the designated network control entity (i.e., the network control entity 194). The information representing the determined route can further be stored in the edge device 186 and implemented at a line card of the edge device 186. Thus, data-plane data units received at the edge device 186 (e.g., from the peripheral processing device 132 or 134) and destined to the peripheral processing device 114 can be sent out from that line card of the edge device 186 based on the route. As a result, the data-plane data units can be sent to the edge device 182, which can forward the data units to the peripheral processing device 114. Particularly, the data-plane data units are sent to the peripheral processing device 114 without going through the edge device 184 that hosts the network control entity 194.

Similarly, for another example, the network control entity 194 can be configured to perform route resolution based on the routing information associated with the peripheral processing device 114. As a result, a data-plane route (e.g., a next hop) for sending data units that are received at the edge device 184 and destined to the peripheral processing device 114 can be determined at the network control entity 194. Such a data-plane route can be associated with, for example, a data path from the edge device 184 to the edge device 182 through the data plane portion of the switch fabric 102. The information representing the determined route can further be stored in the edge device 184 and implemented at a line card of the edge device 184. Thus, data-plane data units received at the edge device 184 (e.g., from the peripheral processing device 122 or 124) and destined to the peripheral processing device 114 can be sent out from that line card of the edge device 184 based on the route. As a result, the data units can be sent to the edge device 182, which can forward the data units to the peripheral processing device 114.

Figure 3:
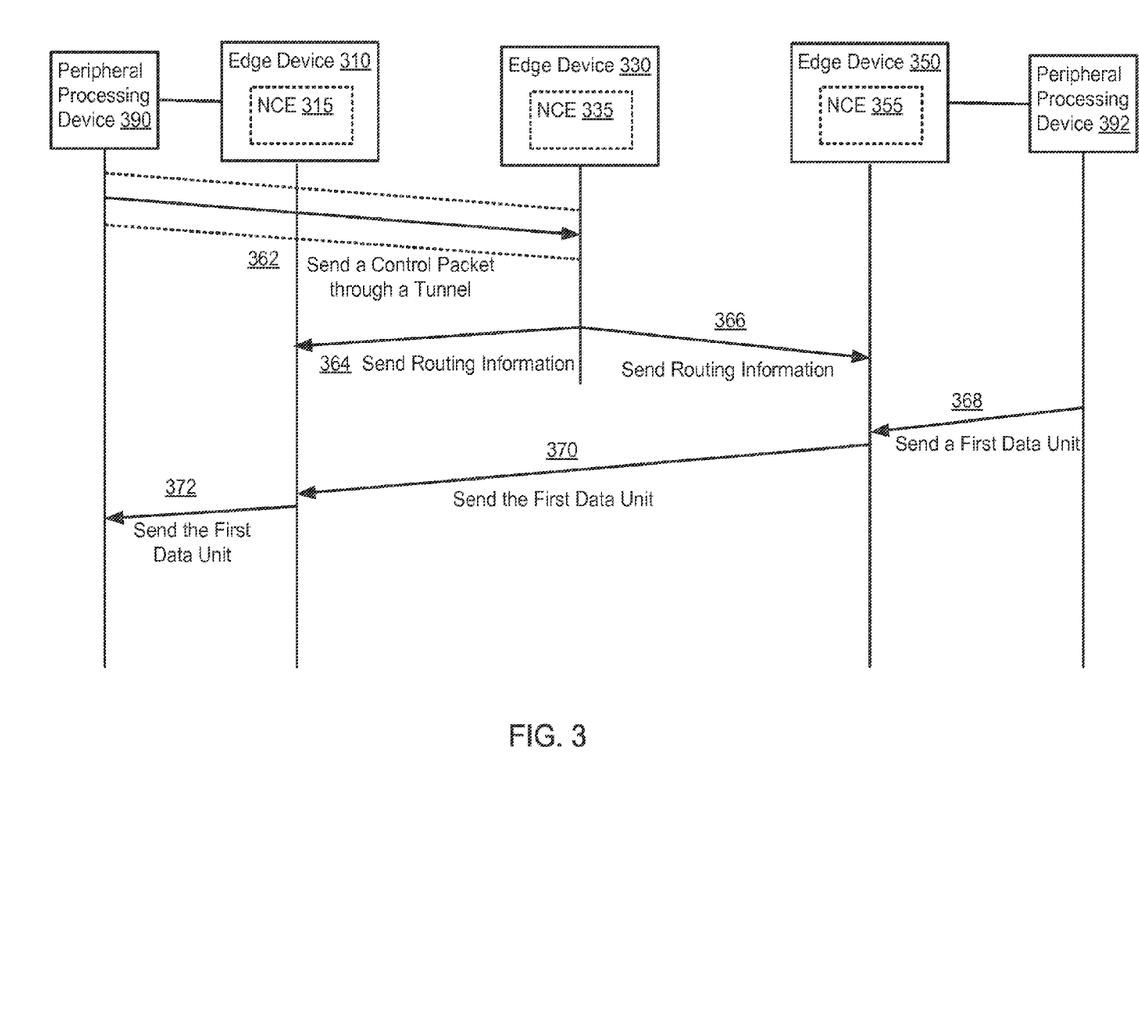
FIG. 3 is a logical representation of a series of operations for distributing routing information and routing data units in a switch fabric system, according to an embodiment.

FIG. 3 is a logical representation of a series of operations for distributing routing information and routing data units in a switch fabric system, according to an embodiment. Specifically, FIG. 3 shows a representation, based on a timeline, of the series of operations between peripheral processing devices 390, 392 and edge devices 310, 330 and 350 that are included in the switch fabric system. As shown in FIG. 3, the peripheral processing device 390 is coupled to the edge device 310; the peripheral processing device 392 is coupled to the edge device 350. Furthermore, the edge devices 310, 330 and 350 include network control entities 315, 335 and 355, respectively.

The peripheral processing devices 390 and 392 are structurally and functionally similar to the peripheral processing devices 112-134 shown and described with respect to FIG. 1. The edge devices 310, 330 and 350 are structurally and functionally similar to the edge devices 182, 184 and 186 shown and described with respect to FIG. 1. The network control entities 315, 335 and 355 are similar to the network control entities 192, 194 and 196 in FIG. 1, respectively. Specifically, the edge devices 310, 330 and 350 are operatively coupled to a distributed switch fabric (similar to the switch fabric 102 in FIG. 1, not shown in FIG. 3) of the switch fabric system. The edge device 310 is operatively coupled to the edge device 330 and the edge device 350 via the distributed switch fabric. In some embodiments, each edge device within the switch fabric system including the edge devices 310, 330 and 350 is operatively coupled to each other edge device within the switch fabric system via the distributed switch fabric. Furthermore, similar to the network control entity 194 in FIG. 1, the network control entity 335 functions as a designated network control entity; similar to the network control entities 192 and 196 in FIG. 1, the network control entities 315 and 355 function as edge device control entities.

Similar to the edge devices 182-186 and the network control entities 192-196 in FIG. 1, the edge devices 310, 330 and 350 including the network control entities 315, 335 and 355 can be configured to determine and distribute routing information, and route data-plane data units based on the routing information in the switch fabric system. Initially, the peripheral processing device 390 sends a control packet to the network control entity 335, shown as the signal 362 in FIG. 3. In some embodiments, such a control packet can be, for example, a BGP message or associated with any other suitable routing protocol (e.g., layer-3 routing protocol). The control packet includes information associated with routing data units originated from or destined to the peripheral processing device 390. For example, the control packet can include information associated with the relative location of the peripheral processing device 390 in the switch fabric system (e.g., coupled to the edge device 310), such that this information can be used by other devices in the switch fabric system to route data units to the peripheral processing device 390.

In some embodiments, the peripheral processing device 390 can be triggered to send the control packet in response to, for example, the peripheral processing device 390 being initially connected to the edge device 310, the peripheral processing device 390 being operatively included in a routing instance associated with the switch fabric system, or any other potential event. In some embodiments, as shown in FIG. 3, the peripheral processing device 390 can be configured to send the control packet to the network control entity 335 via a tunnel through the edge device 310. That is, a portion of the tunnel can include the edge device 310.

In response to receiving the control packet, the network control entity 335 is configured to determine routing information associated with the peripheral processing device 390. In some embodiments, the routing information can be associated with layer-3 data-plane routes connecting the peripheral processing device 390 with other devices (e.g., edge devices) in the switch fabric system. For example, the routing information can include information indicating that data units addressed to the peripheral processing device 390 should be sent within the data plane to the edge device 310, and/or the like.

After determining the routing information associated with the peripheral processing device 390, the network control entity 335 is configured to send the routing information to other network control entities. In some embodiments, the network control entity 335 can be configured to send the routing information to a network control entity in response to receiving a request from that network control entity requesting routing information associated with the peripheral processing device 390. In some embodiments, the network control entity 335 can be configured to send the routing information to a set of network control entities that are associated with a common routing instance as the peripheral processing device 390. For example, the network control entity 355 is configured to send the routing information to the network control entities 315 and 335 (shown as signals 364 and 366 in FIG. 3), which are associated with a common routing instance as the peripheral processing device 390.

In response to determining or receiving the routing information associated with the peripheral processing device 390 from the network control entity 335, a network control entity (e.g., the network control entities 315, 335, 355) can be configured to store and implement the routing information. Specifically, the network control entity can be configured to store the routing information in, for example, a routing database in a memory of an associated edge device that hosts that network control entity. Furthermore, the network control entity can be configured to perform route resolution, based on the routing information, to determine a suitable next hop for forwarding data units addressed to the peripheral processing device 390. For example, the network control entity 355 is configured to perform route resolution based on the routing information associated with the peripheral processing device 390 received from the network control entity 335. As a result of the route resolution, the network control entity 355 determines that the edge device 310 is a suitable next hop for forwarding data units addressed to the peripheral processing device 390. (Here a suitable next hop refers to a node that is used in a routing protocol as a target towards which the data unit is sent, not necessarily the node that is physically connected to the sending node and immediately receives the data unit.)

As shown in FIG. 3, the peripheral processing device 392 sends a first data unit addressed to the peripheral processing device 390 to the edge device 350 (shown as the signal 368). Based on the route resolution performed by the network control entity 355 as described above, the network control entity 355 is configured to forward the first data unit to the edge device 310 via the distributed switch fabric, shown as the signal 370 in FIG. 3. In some embodiments, the edge device 350 can be configured to send within the data plane the first data unit to the edge device 310 without going through the edge device 330 (i.e., the data path connecting the edge device 350 and the edge device 310 does not include the edge device 330). After receiving the first data unit, the edge device 310 is configured to forward the first data unit to the peripheral processing device 390 accordingly, shown as the signal 372 in FIG. 3. In such a method, other devices can route data units to the peripheral processing device 390. Similarly, data units can be routed among other devices (e.g., peripheral processing devices, edge devices) in the switch fabric system.

Figure 4:
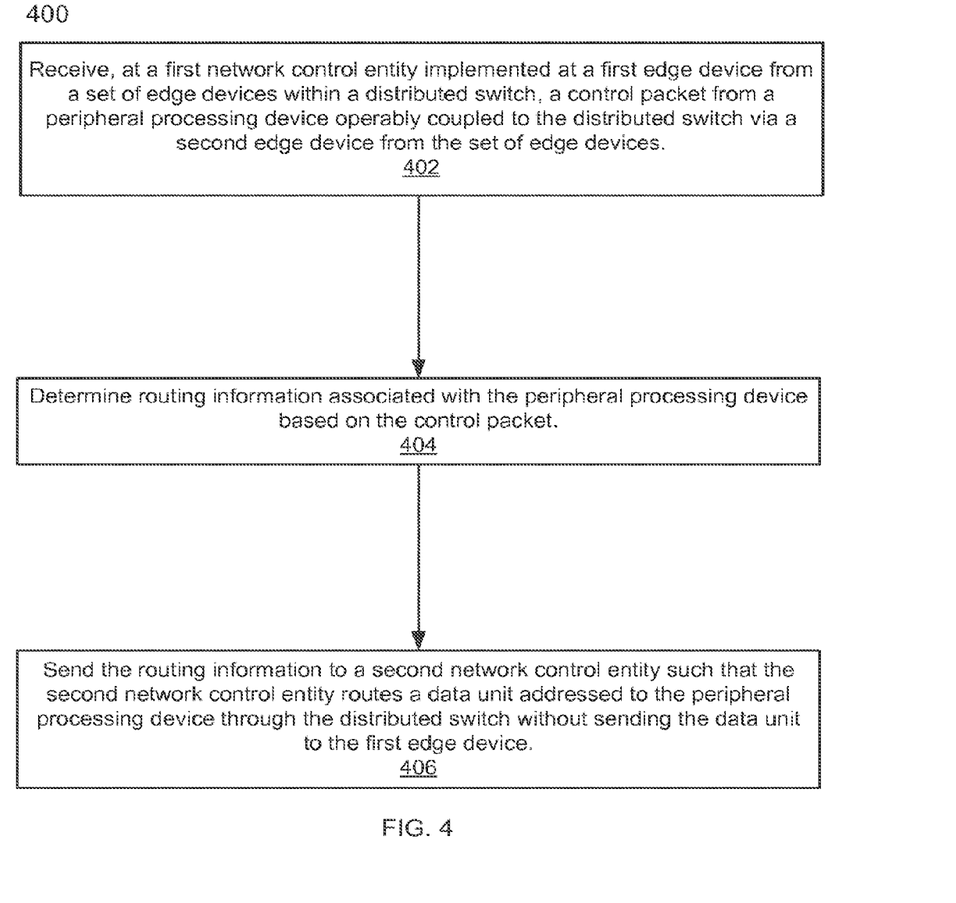
FIG. 4 is a flow chart illustrating a method for distributing routing information within a switch fabric system, according to an embodiment.

FIG. 4 is a flow chart illustrating a method 400 for distributing routing information within a switch fabric system, according to an embodiment. The method 400 can be performed at a first network control entity that is structurally and functionally similar to the network control entity 194 shown and described with respect to FIG. 1 or the network control entity 335 shown and described with respect to FIG. 3. The first network control entity can be hosted and executed at a first edge device (e.g., the edge device 184 in FIG. 1 or the edge device 330 in FIG. 3) from a set of edge devices within a distributed switch (e.g., a switch fabric system similar to the switch fabric system 100 in FIG. 1). Instructions associated with performing the method 400 can be stored within a non-transitory processor-readable medium associated with the first network control entity (e.g., the memory 250 of the edge device 200 in FIG. 2) and executed by a processor associated with the first network control entity (the processor 260 of the edge device 200 in FIG. 2). Particularly, similar to the network control entity 194 in FIG. 1 and the network control entity 335 in FIG. 3, the first network control entity functions as a designated network control entity in the distributed switch.

At 402, the first network control entity receives a control packet from a peripheral processing device operably coupled to the distributed switch via a second edge device from the set of edge devices. In some embodiments, the control packet can be, for example, a BGP message. The second edge device is operably coupled between the peripheral processing device and the first network control entity. In some embodiments, the peripheral processing can be operably coupled to the remaining devices within the distributed switch, including the first network control entity, via the second edge device. In some embodiments, the first network control entity can be configured to receive the control packet via a tunnel between the peripheral processing device and the first network control entity. Such a tunnel can include a portion of the second edge device.

In response to receiving the control packet, the first network control entity determines routing information associated with the peripheral processing device based on the control packet, at 404. The routing information can include, for example, information associated with routing data units to the peripheral processing device. In some embodiments, the routing information can be layer-3 routing information.

At 406, the first network control entity sends the routing information to a second network control entity such that the second network control entity routes a data unit addressed to the peripheral processing device through the distributed switch without sending the data unit to the first edge device. Specifically, the second network control entity routes the data unit to the second edge device without sending the data unit to the first edge device.

In some embodiments, the first network control entity can be configured to update a layer-3 interface (e.g., a line card) of the first edge device based on the routing information. For example, the first network control entity can be configured to perform route resolution based on the routing information to determine a suitable next hop for forwarding a data unit addressed to the peripheral processing device. Based on the result of route resolution, the first network control entity can be configured to update the layer-3 interface of the first edge device, such that the layer-3 interface can be configured to send out data units addressed to the peripheral processing device towards the suitable next hop.

Additionally, in some embodiments, the first network control entity can be configured to send the routing information to each network control entity that is associated with a routing instance. In some embodiments, such a routing instance can be a common routing instance that is associated with the peripheral processing device. In such embodiments, routing information associated with the peripheral processing device can be distributed to other network control entities that are associated with the same routing instance as the peripheral processing device. For example, the first network control entity can send the routing information to a third network control entity implemented at the second edge device, which is associated with a routing instance that is associated with the peripheral processing device.

Some embodiments described herein relate to devices (e.g., access points, mobile communication devices) with a non-transitory computer-readable medium (also can be referred to as a non-transitory processor-readable medium)

having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method, comprising:
    receiving a control packet at a first network control entity from a peripheral processing device, the first network control entity being implemented at a first edge device, the control packet being received through a tunnel between the peripheral processing device and the first network control entity, the tunnel including at least a portion of a second edge device that is coupled to a second network control entity;
    determining routing information associated with the peripheral processing device based on the control packet;
    receiving a routing information request associated with the peripheral processing device from a third network control entity, the third network control entity being implemented at a third edge device; and
    sending the routing information to the third network control entity in response to the routing information request such that the third network control entity routes a data unit addressed to the peripheral processing device to the second edge device without sending the data unit to the first edge device.

2. The method of claim 1, wherein the first network control entity is configured to execute a Border Gateway Protocol core engine.

3. The method of claim 1, wherein the first network control entity receives the control packet such that the second network control entity and the third network control entity are configured to form Border Gateway Protocol peering with the first network control entity.

4. The method of claim 1, wherein the control packet is a Border Gateway Protocol (BGP) message.

5. The method of claim 1, wherein the routing information is layer-3 routing information.

6. The method of claim 1, further comprising:
    sending the routing information to the second network control entity such that the second network control entity routes a data unit addressed to the peripheral processing device to the second edge device without sending the data unit to the first edge device.

7. The method of claim 1, wherein the first edge device, the second edge device, and the third edge device are operatively coupled to a distributed switch fabric.

8. The method of claim 1, further comprising:
    sending the routing information to the second network control entity such that the second network control entity routes a data unit addressed to the peripheral processing device to the second edge device without sending the data unit to the first edge device and such that the second network control entity stores the routing information in a routing database.

9. A non-transitory processor-readable medium storing code representing instructions to cause a processor to:
    receive a control packet at a first network control entity from a peripheral processing device, the first network control entity being implemented at a first edge device and configured to execute a Border Gateway Protocol core engine, the control packet being received through a tunnel between the peripheral processing device and the first network control entity, the tunnel including at least a portion of a second edge device that is coupled to a second network control entity;
    receive a routing information request associated with the peripheral processing device from a third network control entity, the third network control entity being implemented at a third edge device; and
    send routing information associated with the peripheral processing device based on the control packet to the third network control entity in response to the routing information request such that the third network control entity routes a data unit addressed to the peripheral processing device to the second edge device without sending the data unit to the first edge device.

10. The non-transitory processor-readable medium of claim 9, wherein the control packet is received through a control plane portion of a switch fabric based on a Generic Routing Encapsulation (GRE) protocol.

11. The non-transitory processor-readable medium of claim 9, wherein the first network control entity receives the control packet such that the second network control entity and the third network control entity are configured to form Border Gateway Protocol peering with the first network control entity via a relay mechanism.

12. The non-transitory processor-readable medium of claim 9, wherein the control packet is a Border Gateway Protocol (BGP) message.

13. The non-transitory processor-readable medium of claim 9, wherein the routing information is layer-3 routing information.

14. The non-transitory processor-readable medium of claim 9, further comprising code representing instructions to cause the processor to:

send the routing information to the second network control entity such that the second network control entity routes a data unit addressed to the peripheral processing device to the second edge device without sending the data unit to the first edge device.

15. The non-transitory processor-readable medium of claim 9, wherein the first edge device, the second edge device, and the third edge device are operatively coupled to a distributed switch fabric.

16. The non-transitory processor-readable medium of claim 9, wherein the third network control entity is configured to store the routing information in a routing database.

17. An apparatus, comprising:

a first network control entity configured to receive a control packet from a peripheral processing device, the first network control entity being implemented at a first edge device, the control packet being received through a tunnel between the peripheral processing device and the first network control entity, the tunnel including at least a portion of a second edge device that is coupled to a second network control entity;

the first network control entity configured to receive a routing information request associated with the peripheral processing device from a third network control entity;

the first network control entity configured to execute a Border Gateway Protocol core engine such that the second network control entity and the third network control entity form Border Gateway Protocol peering with the first network control entity; and the first network control entity configured to send routing information associated with the peripheral processing device based on the control packet to the third network control entity in response to the routing information request such that the third network control entity routes a data unit addressed to the peripheral processing device to the second edge device without sending the data unit to the first edge device.

18. The apparatus of claim 17, wherein the routing information is layer-3 routing information.

19. The apparatus of claim 17, wherein the control packet is received through a control plane portion of a switch fabric based on a Generic Routing Encapsulation (GRE) protocol.

20. The apparatus of claim 17, wherein the control packet is a Border Gateway Protocol (BGP) message.

* * * * *